Figure 1:
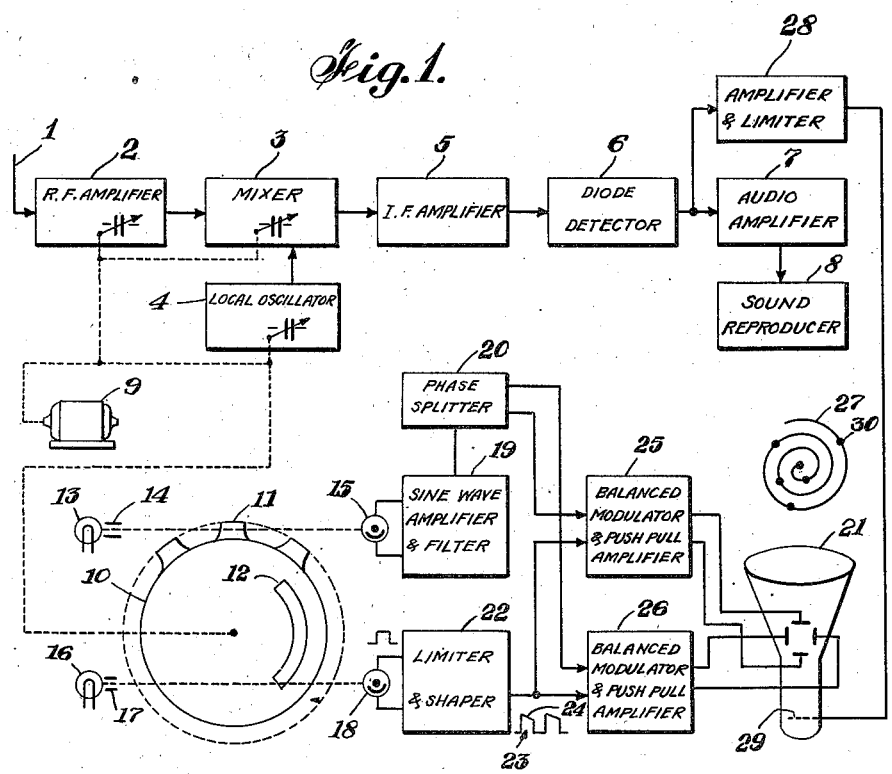

March 2, 1948.　　A. G. RICHARDSON ET AL　　2,436,827
CHANNEL IDENTIFYING SYSTEM
Filed March 9, 1946

INVENTORS
AVERY G. RICHARDSON
MILTON DISHAL
JESSE S. LeGRAND
BY
R. P. Morris
ATTORNEY Patented Mar. 2, 1948

2,436,827

UNITED STATES PATENT OFFICE 2,436,827

CHANNEL IDENTIFYING SYSTEM

Avery G. Richardson, Boonton, and Milton Dishal and Jesse S. Le Grand, Nutley, N. J., assignors to Federal Telephone and Radio Corporation, New York, N. Y., a corporation of Delaware Application March 9, 1946, Serial No. 653,266

18 Claims. (Cl. 315—24)

1

This invention relates to frequency scanning receivers and particularly to the channel identification systems therein.

In some proposed channel identification systems for frequency scanning receivers it has been necessary to turn a knob to bring a "marker" to each indication produced in the system in order to identify the frequency of each incoming signal channel. Furthermore, where two channels were close to each other, it was necessary to expand the sweep. This expanded sweep required synchronizing pulses, sweep tubes and the possibility of fluttering in the operation of the system which would produce incorrect identification. Furthermore, some of the heretofore proposed systems are either too complex or undependable and inaccurate in their frequency identification.

An object of the present invention is the provision of an improved channel identification system.

Another object is the provision of a channel identification system which is relatively simple in operation and construction.

Another object of the present invention is the provision of a channel identification system in which the frequency identifications are positive and accurate.

Another object is the provision of a channel identification system in which the frequency positions of the channels are simultaneously indicated and in which a relatively wide separation between frequency readings is provided so that accurate readings may be instantly made.

In accordance with a feature of the present invention, the indication of the channel is produced by modulation of a spiral trace produced on the screen of a cathode ray tube. Such a spiral trace may be produced by a combination of voltages tending to produce a circular trace with energy having a sloping pulse form, such as for example, a saw tooth pulse or a pulse of trapezoidal wave form the top of which is sloping. In order to produce a spiral sweep that starts at the same point each time it is repeated, it is essential to maintain accurate synchronism between the voltages tending to produce the circular trace and the sloping pulses which change the circular trace into a spiral trace.

Accordingly, another object of the present invention is the provision of improved means for producing a spiral trace which means are characterized by the accurate synchronism between the circular trace voltages and the sloping pulses which modulate said voltages. Thus, the spiral

2 trace is begun at substantially the same point each time it is repeated.

Figure 2:
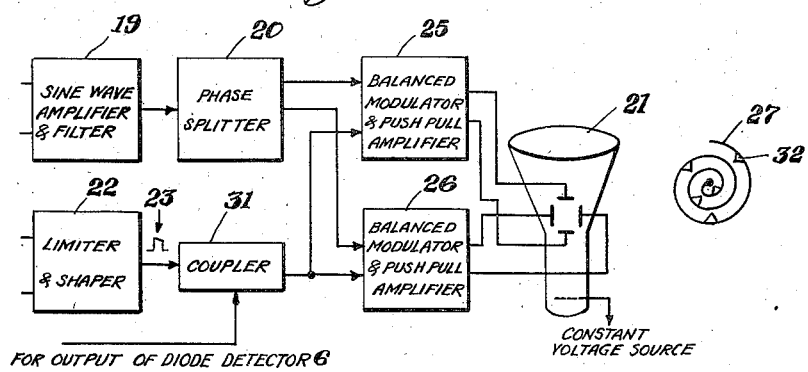

Other and further objects of the present invention will become apparent and the invention will be best understood from the following description of embodiments thereof, reference being had to the drawings in which:

Fig. 1 is a block and schematic diagram of a frequency scanning receiver including a channel identification system embodying the present invention; and Fig. 2 is a block diagram of a modification of part of the system as shown in Fig. 1.

Referring now to Fig. 1, the frequency scanning receiver there illustrated may be of a superheterodyne type including an antenna 1, radio frequency amplifier 2, mixer 3 and local oscillator 4, feeding into an IF amplifier 5, diode detector 6, audio amplifier 7 and a utilization device, such as a sound reproducer 8.

To provide for frequency scanning, condensers, for example, in the radio frequency amplifier 2, mixer 3 and local oscillator 4 may be continuously rotated by means of a continuously rotating motor 9. The motor 9 correspondingly tunes the condensers in devices 2, 3 and 4 so as to frequency scan over a relatively wide band such as, for example, 225 to 400 megacycles.

In accordance with a feature of the present invention, the channel identification system invention, the channel identification system includes a cathode ray tube on whose screen a spiral trace is produced in synchronism with the frequency scanning of the receiver, and the signals, which are received in given frequency channels cause bright spots of light to appear along the spiral trace, as shown in Fig. 1, or cause slight indentations of the trace, as indicated in Fig. 2. In dealing with spiral traces, it is a matter of difficulty to obtain synchronism between the initiation of the trace and development thereof, and some other operation, such for example, as frequency scanning. In accordance with a feature of the present invention, this difficulty is overcome by providing positive means for coordinating the spiral trace with the scanning. This is accomplished in the following manner.

The motor 9 also rotates a disc 10, which may be of metal, fiber or any other material. The disc 10 is provided at its perimeter with spaced teeth 11 which may be, for example, simple gear teeth, and is further provided with a curved slot 12, which covers a radial angle equal to the radial angle of the rotor plates of the scanning condensers, for example, 80°; the pivotal center of the disc being also the center of curvature of curved slot 12. In the embodiment illustrated, the slot 12 is of equal width throughout its curved length or it may be of increasing or decreasing width so as to produce directly a trapezoidal shaped voltage wave. Light from source 13 is directed by any lens system or any other suitable means, such as a collimating slit 14, through the teeth 11 of disc 10 to a photoelectric tube 15. Likewise light from a source 16 is directed by another collimating slit 17 through the slot 12 to the photoelectric tube 18. As the disc 10 rotates, the teeth 11 interrupt the light to the photoelectric tube 15, and thereby produce a sine wave (approximately) or square wave output therefrom. Likewise, as disc 10 rotates, light from source 16 will pass through slot 12 during the working angle of the scanning condenser (80° in the example considered) and cause a rectangular voltage wave in photoelectric tube 18.

The output of photoelectric tube 15 is then fed to a sine wave amplifier and filter 19 to produce a sine wave whose frequency is determined by the rate of rotation of disc 10 and the number and spacing of the teeth 11. This sine wave output is then fed to a phase splitter 20. The output of phase splitter 20 would, if applied directly to the deflection plates of cathode ray tube 21, produce a circular trace. However, since it is desired to produce a spiral instead of a circular trace, it is necessary to modify or modulate this split phase output of phase splitter 20. The modulating energy is derived from photoelectric tube 18, the output of which is fed to a limiter and shaper 22, which serves to sharpen the sides of the rectangular wave output of the photoelectric tube 18, and by means of an RC circuit to produce a trapezoidal wave form 23, having a downwardly sloping top 24. These trapezoidal pulses 23 are used to modulate the two phase outputs of phase splitter 20 in balanced modulators and push pull amplifiers 25 and 26 respectfully. Each output of the phase splitter 20 is fed in push pull to the input of the balanced modulator while the trapezoidal pulses 23 are fed in parallel thereto. The trapezoid 23 thus modulates the sine wave output of the phase splitter 20 so that the resultant trace produced in cathode ray tube 21 when the output of the balanced modulators and push pull amplifiers 25 and 26 are applied to the deflection plates is a spiral trace 27, with the spiral starting on the outside due to the tail leading edge of pulse 23 and gradually approaching toward the center of the screen due to the downwardly slanting top 24. As it was stated heretofore, the angle that slot 12 makes for the balanced scanning condenser of this example is 80° of the total circumference of the disc 10. The pulse produced as a result thereof has substantially $80/360$ of the total duration of the complete cycle of rotation of disc 10. Therefore, the spiral will be produced only for 80° of each cycle with the beam being at the center of the screen for the remainder thereof. Since the phase splitter sine voltages and the trapezoidal pulses are derived from the rotation of the same disc, said voltages and said pulses are accurately synchronized.

The number of turns produced in spiral trace 27 depends upon the number of teeth, or more accurately the number of spaces between the teeth, which are in the same sector of the disc as slot 12. Thus, if there are 9 teeth with 9 spaces therebetween in the same sector as slot 12, there will be 9 turns.

The condensers in the radio frequency amplifier 2, mixer 3 and local oscillator 4 may be of the split stator type which cover their complete range in about 80° of a complete rotation. These condensers are aligned and ganged together with a rotor having a common rotational shaft as driven by motor 9. The shaft of motor 9 also turns disc 10. During the portion of the cycle during which the disc 10 rotates with the slot 12 permitting the light from source 16 to impinge upon photoelectric tube 18, the spiral 27 is traced from the outside to the center. During the remainder of the rotational cycle of disc 10 and the various tuning condensers, the trace remains at the center of the screen. The motor 9 may rotate at a relatively slow speed such as for example, 900 to 1800 R. P. M. The lower limit of speed of rotation of said motor is in part determined by the light persistence of the screen of cathode ray tube 21.

To indicate what frequencies are being picked up, the output of diode detector 6 is fed through an amplifier and limiter 28, to the intensity control electrode 29 of cathode ray tube 21. As the signal energy comes in, it is fed through the amplifier and limiter 28 so that the output thereof is in the form of pulses, which pulses brighten up the cathode ray tube 21 during the brief interval of time during which the receiver is tuned to the particular frequency of any channel. Thus, the spiral trace 27 on the screen of the cathode ray tube has a plurality of bright spots 30 produced thereon, each spot indicating the particular frequency at which energy is being received. By providing a suitably calibrated spiral scale, which may be in the form of a transparent disc arranged across the face of the screen, the bright spots can be instantly read against the calibration to determine at what frequency energy is being received. In another method, instead of bright spots, the trace is temporarily deflected inwardly at the points corresponding to given frequencies at which energy is being received. This is illustrated in Fig. 2.

Referring now to Fig. 2, in which the same numerals as in Fig. 1, have been applied to similar devices performing similar functions, the output of sine wave amplifier 19 is fed to phase splitter 20 as in Fig. 1, and the split phase output of phase splitter 20 is fed in push pull to the balanced modulators and amplifiers 25 and 26 respectively. However, the output of limiter and shaper 22, which consists of the trapezoidal pulses 23 is not fed directly in parallel to the balanced modulators and amplifiers 25 and 26, but instead is fed to a coupler 31, to which is also fed the signal output of diode detector 6. The signal output of diode detector 6 in coupler 31, is added to the trapezoidal pulses 23 to produce dips along the slanting top 24 of pulses 23 at places therealong corresponding to the frequency channel at which signals are picked up. The output of coupler 31 is then fed in parallel to the balanced modulators and push pull amplifiers 25 and 26, whose output is then fed to the deflection plates of cathode ray tube 21. The intensity control electrode 29 of cathode ray tube 21 is in this embodiment controlled by a constant voltage source to produce a constant light output. The spiral trace 27 in this method is characterized by little indentations 32 pointing inwardly toward the center of the cathode ray tube, each point corresponding to the frequency at which signals are being received, or corresponding to the channels of incoming signals.

While we have described various details of our invention in one embodiment and modifications thereof, it will be apparent that numerous changes may be made in these details without departing from the teachings of our invention. For example, the sine waves for producing the voltages tending to cause a circular trace may be directly obtained from the rotation of disc 10 without the intervention of a phase splitter by displacing two photoelectric tubes about the circumference of the disc so that the energy produced in the photoelectric tubes is 90° out of phase. Furthermore, while we have shown a disc having openings therein for the control of the light between the light sources and the photoelectric tubes, it will be apparent that other means such as for example, a rotatable member having reflectors or mirrors thereon may be used for this purpose. Other changes will likewise occur to those versed in the art.

Accordingly, while we have described above the principles of our invention in connection with specific apparatus, and particular modifications thereof, it is to be clearly understood that this description is made only by way of example and not as a limitation on the scope of our invention as set forth in the objects of our invention and the accompanying claims.

We claim:

1. A cathode ray tube having a screen and beam deflecting means; and means producing a spiral trace on said screen comprising light-emitting means, a first and second photoelectric means, a member mounted for cyclic motion adapted to periodically direct light from the light-emitting means to said first and second photoelectric means, means coupled to said beam deflecting means and controlled by said first photoelectric means for producing voltages tending to form a circular trace on said screen, and means controlled by said second photoelectric means for modulating said voltages to produce a spiral trace.

2. The combination according to claim 1, wherein said member is rotatably mounted, and further including a motor mechanically coupled to said member for rotating it.

3. The combination according to claim 1, wherein said member is in the form of a rotatable disc having a plurality of openings therein through which the light is adapted to pass as the disc rotates to impinge on said first and second photoelectric means and further including a motor coupled to said disc for rotating it.

4. The combination according to claim 1, wherein said member is in the form of a disc having a plurality of openings therein through which the light is adapted to pass as the disc rotates to impinge on said first photoelectric means, said disc further having a slot therein through which light is adapted to pass as the disc rotates to impinge on said second photoelectric means, and a motor coupled to said disc for rotating it.

5. The combination according to claim 1, wherein said member is in the form of a disc having a plurality of openings therein through which light is adapted to pass as the disc rotates to impinge on said first photoelectric means, said disc further having a curved slot therein with the rotational pivot of said disc at the center of curvature of said slot, and a motor coupled to said disc for rotating it.

6. The combination according to claim 1, wherein the means controlled by said first photoelectric means includes means for producing two sine waves 90° out of phase with each other, and means for applying said sine waves to the deflection electrodes of said cathode ray tube.

7. The combination according to claim 1, wherein said means controlled by said first photoelectric means includes means for producing two sine waves 90° out of phase with each other, means for applying said sine waves to the deflection electrodes of said cathode ray tube, and said means controlled by said photoelectric means includes means for producing a sloping potential, and means for applying said sloping potential to modulate said sine waves.

8. The combination according to claim 1, wherein said means controlled by said first photoelectric means includes means for producing sine waves in response to the output of said photoelectric means, a 90° phase splitter coupled to the output of the aforesaid means, a pair of balanced modulators, the separate outputs of said phase splitter being applied in push pull to separate ones of said pair of modulations, said means controlled by said second photoelectric means including means for producing pulses of sloping potential means for applying said pulses in parallel to said modulators.

9. A frequency scanning receiver including means for receiving and detecting signal energy, frequency tuning means and a motor for continuously driving said frequency tuning means; and a channel indication system for indicating the frequencies of incoming signals picked up by said receiver comprising a cathode ray tube having a screen and beam deflecting means; and means producing a spiral trace on said screen comprising light-emitting means, a first and second photoelectric means, a member mounted for cyclic motion adapted to periodically direct light from the light-emitting means to said first and second photoelectric means, means coupling said motor to drive said member, means coupled to said beam deflecting means and controlled by said first photoelectric means for producing voltages tending to form a circular trace on said screen, means controlled by said second photoelectric means for modulating said voltages to produce a spiral trace, and means coupling said receiver to said tube for producing indications on said spiral trace at points corresponding to the frequencies of the incoming signals.

10. The combination according to claim 9, wherein said member is rotatably mounted.

11. The combination according to claim 9, wherein said member is in the form of a rotatable disc having a plurality of openings therein through which the light is adapted to pass as the disc rotates to impinge on said first and second photoelectric means.

12. The combination according to claim 9, wherein said member is in the form of a disc having a plurality of openings therein through which the light is adapted to pass as the disc rotates to impinge on said first photoelectric means, said disc further having a slot therein through which light is adapted to pass as the disc rotates to impinge on said second photoelectric means.

13. The combination according to claim 9, wherein said member is in the form of a disc having a plurality of openings therein through which light is adapted to pass as the disc rotates to impinge on said first photoelectric means, said disc further having a curved slot therein with the rotational pivot of said disc at the center of curvature of said slot, said slot comprising a sector of the disc equal to more than one of said openings.

14. The combination according to claim 9, wherein the means controlled by said first photoelectric means includes means for producing two sine waves 90° out of phase with each other.

15. The combination according to claim 9, wherein said means controlled by said first photoelectric means includes means for producing two sine waves 90° out of phase with each other, means for applying said sine waves to the deflection electrodes of said cathode ray tube, and said means controlled by said photoelectric means includes means for producing a sloping potential.

16. The combination according to claim 9, wherein said means controlled by said first photoelectric means includes means for producing sine waves in response to the output of said photoelectric means, a 90° phase splitter coupled to the output of the aforesaid means, a pair of balanced modulators, the separate outputs of said phase splitter being applied in push pull to separate ones of said pair of modulators.

17. The combination according to claim 9, wherein said means coupling said receiver to said cathode ray tube includes means for coupling the output of detector to the intensity controlled electrode of said cathode ray tube to vary the intensity of the beam in response to incoming signals.

18. The combination according to claim 9, wherein said means controlled by said first photoelectric means includes means for producing sine wave voltages tending to produce a circular trace, means for applying said sine wave voltages to said cathode ray tube, and said means controlled by said photoelectric means includes means for producing a sloping potential, and means for applying said sloping potential to modulate said sine wave voltages, and said means coupling the receiver to the cathode ray tube includes means for combining said sloping potentials with the response due to incoming signals.

AVERY G. RICHARDSON.
MILTON DISHAL.
JESSE S. LE GRAND.